United States Patent [19]

Donermeyer

[11] 4,053,682

[45] Oct. 11, 1977

[54] PROCESS FOR IMPROVING THE ADHESION OF HOT MELTS TO METAL SUBSTRATES

[75] Inventor: Donald D. Donermeyer, Springfield, Mass.

[73] Assignee: Monsanto Company, St. Louis, Mo.

[21] Appl. No.: 698,241

[22] Filed: June 21, 1976

[51] Int. Cl.² ............................................. B32B 15/08
[52] U.S. Cl. ................................... 428/460; 428/480; 427/388 B; 427/409
[58] Field of Search ........................... 427/388 B, 409; 428/460, 480

[56] References Cited

U.S. PATENT DOCUMENTS

| | | | |
|---|---|---|---|
| 3,650,999 | 3/1972 | Martins et al. | 260/22 D |
| 3,849,514 | 11/1976 | Gray et al. | 260/857 PE |
| 3,877,998 | 4/1975 | Guhde | 427/388 B |

Primary Examiner—Ralph S. Kendall
Attorney, Agent, or Firm—R. Bruce Blance; William J. Farrington; James C. Logomasini

[57] ABSTRACT

Adhesion of filled poly(ester-amide) adhesive compositions to metal substrates is improved by priming the metal substrate with a tie coat of an etherified methylolmelamine prior to application of the filled poly(ester-amide). The etherified methylolmelamine is the condensation product of melamine, formaldehyde and an alkanol or cycloalkanol in which the degree of methylolation is in the range of about 5 to 6, the degree of etherification is in the range of about 3 to 6 and the degree of methylation is at least about 2.

16 Claims, No Drawings

PROCESS FOR IMPROVING THE ADHESION OF HOT MELTS TO METAL SUBSTRATES

BACKGROUND OF THE INVENTION

1. Field of the Invention

The present invention relates to a method of improving the adhesion of a poly(ester-amide) hot melt adhesive composition, to a metal substrate and to metal articles filled or coated with the hot melt adhesive composition. More particularly, it refers to a method of improving the adhesion of a block copoly(ester-amide) filled with a finely divided metal powder to metal substrates by means of a tie coat of melamine formaldehyde resin, and to metal articles primed with a melamine formaldehyde resin and filled or coated with the block copoly(ester-amide) composition.

2. Description of the Prior Art

Hot melt adhesives are well known in the prior art. These materials are conveniently applied to a substrate in the molten state and upon cooling form an adhesive bond. However, a deficiency common to most of the hot melt adhesives of the prior art is their tendency to soften and flow at elevated temperatures, as for example, 70° to 100° C. with a resulting loss of bond strength. Consequently, these materials are not suitable for use over a broad temperature range.

Attempts to upgrade the softening and flow temperatures have involved using very high molecular weight resinous materials and/or crosslinking of the resin. These methods have resulted in materials with higher softening points and flow temperatures. However, in most cases the resulting material was not adapted to thermal processing because of its higher molecular weight and/or crosslinked structure resulting in extremely high application viscosity. Thus, these materials were not suitable for use as hot melt adhesives.

U.S. Pat. No. 3,650,999 discloses a poly(ester-amide) resin having improved adhesion and high temperature performance obtained by reacting a crystalline polyester, a $C_{18}$ to $C_{54}$ polycarboxylic acid and a primary diamine. However, this poly(ester-amide) in common with other hot melt adhesives has deficiencies in creep resistance at temperatures above 150° C. in the range up to 205° C. and above and in shrinkage when the hot melt is cooled to room temperature after application. Improvement in creep resistance can be obtained by incorporating inorganic particulate fillers.

In the manufacture and repair of metal bodies such as automobiles and appliances, solder compositions containing lead are frequently used to fill cavities and voids. These lead solders are a health hazard which mandates special handling to protect workers and are also extremely dense. Conventional hot melt adhesives are not satisfactory for such cavity and void filling applications because they cannot be sanded rapidly at assembly line speed, they do not readily accept paint because they bleed through, and they do not withstand the curing temperatures for the paint. Curable adhesives such as epoxies are generally unsatisfactory because they require careful metering of the components to provide good physical properties and bond strength, and because they take too long to cure to a sandable state.

A need therefore exists for a cavity or void forming composition which is less dense and toxic than lead solder, forms a strong bond to metal substrate, withstands extremes of humidity and temperature, is readily applied and rapidly sets to a sandable state, is easily sanded smooth, and accepts paint without bleeding through. These needs are met by the adhesive compositions disclosed in U.S. applications Ser. No. 654,490 and 654,679 filed Feb. 2, 1976.

The adhesive compositions disclosed therein comprise from about 70 to about 30 parts by weight of a poly(ester-amide) block copolymer melting in the range of about 155° to about 225° C., having from about 30 to about 70 percent by weight of crystalline polyester segments and from about 70 to about 30 percent by weight of amorphous polyamide segments and from about 30 to about 70 parts by weight of finely divided spheroidal metal powder selected from the group consisting of aluminum, iron, mild steel, stainless steel and zinc.

However, when filled adhesive compositions containing inorganic particulate fillers especially those containing high ratios of filler and/or block polyesteramide of high glass transition temperature are applied to bare metal substrates they tend to exhibit low peel strength at low temperatures particularly at temperatures below 0° F. ($-18°$ C.). A need therefore exists for a method of improving the adhesion of the filled adhesive compositions to metal surfaces and enhancing the peel strength of the bond formed between the filled adhesive compositions and such metal substrates. A need also exists for metal articles coated or filled with such block copoly(ester-amide) compositions which exhibit improved bonding between the metal substrate and the block copolyesteramide. A need also exists for a primer or tie-coat which enhances the adhesion of the block copoly(ester-amide) to metal surfaces and which can withstand the high temperature which the metal is subjected to, prior to application of the hot melt adhesive. A need also exists for a primer or tie-coat which can be applied in essentially undiluted form free of toxic or flammable solvent.

SUMMARY OF THE INVENTION

These needs are met by means of a primer or tie coat of melamine formaldehyde resin which is not adversely affected by elevated temperatures and which enhances the adhesion of the filled block copoly(ester-amide) compositions to the metal substrate. The present invention is therefore directed to a process of improving the adhesion to a metal substrate of a block copoly(ester-amide) containing an inorganic particulate filler which comprises applying to the metal substrate sufficient etherified methylol melamine as a priming layer to enhance the adhesion of the block copoly(ester-amide) to the metal substrate, heating the metal substrate to a temperature in the range of about 150° – 300° C. and applying the filled block copoly(ester-amide) as a hot melt to the primed metal substrate, and cooling the filled block copoly(ester-amide) below its crystallization temperature.

Another aspect of the invention is directed to an article of manufacture comprising a metal substrate coated or filled with a block copoly(ester-amide) composition containing an inorganic filler, primed with sufficient etherified methylol melamine to enhance the bond between the metal substrate and the block copoly(ester-amide).

The etherified methylol melamine is prepared by condensing melamine with formaldehyde and etherifying the resultant methylolmelamine with methanol or a mixture of methanol and a $C_2$ to $C_6$ alcohol. The degree of methylolation is in the range of 5.0 to 6.0, the degree of etherification is in the range of about 3.0 to about 6.0 and the degree of methylation is at least about 2.0. Surprisingly and unexpectedly, these etherified methylol melamines are effective as a primer or tie coat to enhance the bond between metal substrates and the block copoly(ester-amide) composition while other materials such as etherified methylolureas and alkylated methylolmelamines with a low degree of methylation are ineffective.

DESCRIPTION OF THE PREFERRED EMBODIMENTS

The poly(ester-amide) component of the present invention is a block copolymer containing a crystalline segment and an amorphous segment as described in U.S. Pat. Nos. 3,650,999 and 3,849,514, which patents are incorporated herein by reference. The block copolyester-amide contains a polyamide segment prepared by condensing an aliphatic, alicyclic or aromatic diamine with an aliphatic, alicyclic or aromatic dicarboxylic acid (or ester thereof) and a polyester segment prepared by condensing an aliphatic, alicyclic or aromatic diol (or diester thereof) with an aliphatic, alicyclic or aromatic dicarboxylic acid (or ester thereof).

In general, any aliphatic, alicyclic, and aromatic difunctional diamine can be used to prepare the prepolyamide. Examples of such diamines include polymethylenediamines of the formula $H_2N(CH_2)_xNH_2$, wherein $x$ is a positive integer of from 2 to 12 (such as dimethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, and dodecamethylenediamine); 1,1-, 1,2-, 1,3- and 1,4-cyclohexanebis(methylamines); o-, m-, and p-xylene- α, α'-diamines; 1,2-, 1,3-, and 1,4-cyclohexanediamines; 3-methylhexamethylenediamine; 3-methylheptamethylenediamine; 2,4-dimethylhexamethylenediamine; 2,4-toluenediamine; p,p'-diphenyldiamine; 1,4-dimethyl-3,5-diaminobenzene; 2,5-norcamphanebis(methylamine); o-, m-, and p-phenylenediamines; 2,5-, 2,6-and 2,7-naphthalenediamines; benzidine; 4,4'-methylenedianiline; and 3,4'-diaminodiphenyl. The N,N'-diphenyldiamines of U.S. Pat. No. 3,297,656 can also be employed.

In general, any aliphatic, alicyclic, and aromatic difunctional dicarboxylic acid (or esters thereof, as explained below) can also be used to prepare the prepolyamide and prepolyester. Examples of such acids include oxalic; malonic, dimethylmalonic; succinic; glutaric, adipic; trimethyl adipic; pimelic; 2,2-dimethylglutaric; azelaic, sebacic; suberic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; t-butyl isophthalic; 2,5-norbornanedicarboxylic; 1,4-naphthalic; diphenic; 4,4'-oxydibenzoic; diglycolic; theiodipropionic; 2,2,4-trimethyladipic; 4,4'-sulfonyldibenzoic; 2,5-naphthalenedicarboxylic; 2,6-naphthalenedicarboxylic; and 2,7-naphthalenedicarboxylic acids. It will be understood that the corresponding esters of these acids are included in the term "dicarboxylic acid". Examples of these esters include dimethyl-1,4-cyclohexanedicarboxylic; dimethyl-2,6-naphthalenedicarboxylate; dimethyl-4,4'-sulfonyldibenzoate; dimethyl isophthalate; dimethyl terephthalate; and diphenyl terephthalate. The polycarboxylic acids of U.S. Pat. No. 3,157,681 can also be used.

In general, any aliphatic, alicyclic, and aromatic difunctional diols can be used to prepare the prepolyester. Examples of such diols include ethylene glycol; propylene glycol; diethylene glycol; 1,2-propylene glycol; 2,4-dimethyl-2-ethylhexane-1,3-diol; 2,2,4-trimethyl-1,3-pentanediol; 2,2-dimethyl-1,3-propanediol; 2-ethyl-2-butyl-1,3-propanediol; 2,2-diethyl-1,3-propanediol; 2-methyl-2-propyl-1,3-propanediol; 2-ethyl-2-isobutyl-1,3-propanediol; 1,3-butanediol; 1,6-hexanediol; 2,2,4-trimethyl-1,6-hexanediol; 1,2-cyclohexanedimethanol; 1,3-cyclohexanedimethanol; 1,4-cyclohexanedimethanol; 2,2,4,4-tetramethyl-1,3-cyclobutanediol; o-, m-, and p-xylylene diols; 4,4'-sulfonyldiphenol; 4,4'-oxydiphenol; 4,4'-isopropylidenediphenol; and 2,5-naphthalenediol.

In general the selection of diamine and dicarboxylic acid for the polyamide segment and the selection of the diol and dicarboxylic acid for the polyester is limited only by the requirement that one segment is crystalline and has a melting point of at least about 180° C. and one segment is amorphous. The copoly(ester-amide) contains 10 to 70 percent by weight of polyamide segment and correspondingly, from 90 to 30 percent by weight of polyester segment. Preferably, it contains 30 to 70 percent by weight of polyamide segment and correspondingly, from 70 to 30 percent by weight of polyester segment. The inherent viscosity of the segment is at least 0.05 measured as a 0.5 gram solution in 100 ml of a 60/40 phenol/tetrachloroethane solvent pair at 25° C. (and the inherent viscosity of the copoly(ester-amide) is in the range of about 0.35 to about 0.95.

In a preferred embodiment, the polyester segment is crystalline and an inherent viscosity of from 0.05 to 0.70 is required in order to insure that the polyester will contribute the optimum crystalline structure to the final polymeric product. Polyesters with an intrinsic viscosity below 0.05 have a short chain length and cannot contribute the necessary crystalline structure to the final polymeric product which also comprises amorphous polyamide blocks. Inherent viscosities greater than about 0.70 require excessive reaction times or temperatures to form homogenous poly(ester-amides). Thus, it is impractical to use polyester reactants with intrinsic viscosities greater than 0.70 in the practice of the present invention. Moreover, excessive reaction times and temperatures tend to cause degradation of the polymer and a subsequent loss in adhesive properties.

The minimum melting point requirement of about 180° C. for the polyester reactant is necessary in order to insure that the final polymeric product has excellent thermal properties such as resistance to flow at elevated temperatures. Preferably, the melting point of the polyester is in the range of from 200° to 270° C.

Representation examples of high melting crystalline polyesters suitable for preparation of the preferred block copolyesters include polymeric ethylene terephthalate, neopentyl terephthalate, ethylene 2,6-naphthalate, tetramethylene terephthalate, tetramethylene 2,6-naphthalate, trimethylene 2,6-naphthalate, 1,4-cyclohexylene dimethylene terephthalate, and copolyesters, such as copolyesters of ethylene terephthalate containing at least 50 mol percent of ethylene terephthalate, such as 95/5, 90/10, 85/15 and 50/50 ethylene terephthalate-ethylene isophthalate copolyesters, ethylene terephthalate-ethylene adipate copolyesters, and ethylene terephthalate-ethylene hexahydroterephthalate copolyesters, tetramethylene terephthalate-tetramethylene azelate copolyesters containing at least 80 mol percent of tetramethylene terephthalate, 1,4-cyclohexylene dimethylene terephthalate-azelate copolyesters containing 70 to 90 mol percent of 1,4-cyclohexylene dimethylene terephthalate, copolyesters of ethylene 2,5- and 2,6-naphthalate containing from 80 to 90 mol percent of the ethylene naphthalate, such as ethylene, 2,5-naphthalate-ethylene azelate and ethylene 2,6-naphthalate-ethylene azelate copolyesters. These polyesters blocks can be derived from various dicarboxylic acids and various glycols. Representative examples of such acids are terephthalic acid, isophthalic acid, hexahydroterephthalic acid, the naphthalic acids, such as 2,6-, 2,7-, 2,8-, 1,5- and 1,4-naphthalene dicarboxylic acids and other such acids which form high melting polyester resins. Examples of glycols are ethylene glycol, propylene glycol, tetramethylene glycol, neopentyl glycol, 1,4-cyclohexane diol, 1,4-cyclohexane dimethanol and other such glycols. High melting polymers containing components such as 2,2-dimethyl propane diol, form polyesters which have melting points above 234° C. Mixtures of the foregoing polyesters can also be used.

Preferably, a polyester from the following group is used to prepare the preferred polyesteramide component of the present invention:

Poly(ethylene terephthalate/isophthalate), 100/0 to 75/25;
Poly(hexamethylene terephthalate), 100/0 to 75/25;
Poly(ethylene/neopentyl terephthalate), 100/0 to 75/25;
Poly(tetramethylene terephthalate/isophthalate), 100/0 to 75/25;
Poly(tetramethylene/hexamethylene terephthalate), 100/0 to 75/25;
Poly(tetramethylene/neopentyl terephthalate), 100/0 to 75/25;
Poly(ethylene/propylene terephthalate), 100/0 to 60/40; and
Poly(tetramethylene-2,6-naphthalate/terephthalate), 100/0 to 75/25; etc.

The amide portion of the preferred polyester-amides is an amorphous block segment which contributes wettability, elasticity and rubber character to the adhesive composition. The polyamide portion of the preferred polyester-amide composition of the present invention is the reaction product of a $C_{18}$ to $C_{54}$ polycarboxylic acid and an aliphatic primary diamine. The polycarboxylic acids are well known in the art and are described in detail in U.S. Pat. No. 3,157,681 and other references. These materials are available commercially as mixtures of monobasic, dibasic and tribasic acid with the dibasic acid being present as the major component of the mixtures. These materials generally have a composition as follows:

| | Percent by Weight |
|---|---|
| $C_{18}$ monobasic acids (Monoacids) | 0 – 10 |
| $C_{36}$ dibasic acids (Dimer acids) | 80 – 100 |
| $C_{54}$ and higher polybasic acids (Trimer acids) | 0 – 10 |

The relative ratios of monomer, dimer and trimer in such unfractionated polymeric fat acids are dependent on the nature of the starting materials and the conditions of polymerization. For the purposes of this invention, the term polycarboxylic also includes mixtures of the mono, di and tribasic acids.

The aliphatic or alicyclic primary diamines used in the preferred block copolyester amides contain from 2 to 10 carbon atoms. These include ethylene diamine, 1,3-propane diamine, 1,4butanediamine, 1,5-pentane diamine, hexamethylene diamine, 1,10-decanediamine, cyclohexyldiamine, 2,2-dimethyl-1,3-propane diamine, etc.

Optionally up to 60 percent by weight of a linear aliphatic dibasic acid having from 4 to 10 carbon atoms may be substituted for a corresponding amount of the $C_{18}$ to $C_{54}$ polycarboxylic acid used to prepare this portion of the preferred polyesteramide. Examples of these acids would include oxalic, malonic, succinic, glutaric, adipic, pimelic, suberic, azelaic, and sebacic acids. The advantage of substituting the $C_4$ to $C_{10}$ acids for the $C_{18}$ to $C_{54}$ acids is to permit more heterogenous character to the polyamide portion of the polymer in those applications where a more heterogenous character is desired.

The preferred poly(ester-amide) component of the present invention contains 30 to 70 percent by weight of polyamide segment and correspondingly, from 30 to 70 percent by weight of crystalline polyester segments. Preferably, it contains 30 to 60 percent by weight of polyamide segment and correspondingly, from 70 to 40 percent of crystalline polyester segments. The poly(ester-amides) are further characterized as having an inherent viscosity in the range of from 0.35 to 0.95 and more preferably from 0.40 to 0.6 when measured as a 0.5 gram solution of poly(ester-amide) in 100 ml. of a 60.40 phenol/tetrachloroethane solvent pair at 25° C. The glass transition temperature of these polymers as measured by DTA or DSC is in the range of −30° to 40° C.; the crystalline melting point as measured by DTA or DSC is in the range of from 155° to 225° C. and the melt viscosity at 220° C. is in the range of from 5000 to 65,000 centipoises. The poly(ester-amide) resins are soluble in a 60/40 phenol/tetrachloroethane solvent pair and insoluble in a 1/1 toluene/isoprophanol solvent pair. Moreover, the 1/1 toluene/isopropanol extractable content of the poly(ester-amide) resins is less than 2 percent. In view of the fact that the polyamide portion is soluble in toluene/isopropanol solvent pair the very low order of extractables for the poly(ester-amide) resins demonstrates that they are true block copolymers and not physical blends of polyester and polyamide segments.

The poly(ester-amide) is prepared by a one step or two step method. In the one step method the acid and amine components, which go to form the polyamide segments are polymerized in the presence of the polyester prepolymer. In the two step method the polyamide and polyester prepolymer segments are prepared separately and then reacted together to form the polyesteramide. These methods are discussed in greater detail in the working examples of U.S. Pat. Nos. 3,650,999 and 3,849,514.

The morphological properties of the poly(ester-amides) are determined on a duPont differential thermal analyzer Model DTA 900 using the differential scanning calorimeter attachment, with a 5 to 25 mg sample heated at a rate of 20° C. in a nitrogen atmosphere. The glass transition point ($T_g$) is the onset of the increase in specific heat of the polymer and is the intersection of the base line and the slope of increasing specific heat; the melting point ($T_m$) is the temperature observed at the apex of the melting endotherm peak.

The second component of the adhesive composition is a finely divided inorganic particulate filler selected from a wide variety of minerals, metals, metal oxides and metal salts such as silicates and aluminates. Such fillers include wollastonite, mullite, calcium magnesium silicates, aluminum silicate, quartz, cristobalite, calcium carbonate, etc.; metals such as aluminum, tin, titanium, copper, and zinc; metal oxides in general such as oxides of aluminum, tin, lead, magnesium, calcium, strontium, barium, titanium, zirconium, vanadium, chronium, manganese, iron, cobalt, nickel, copper, and zinc; heavy metal phosphates, sulfides, and sulfates, and basic mineral and mineral salts such as clays, calcined clays, spodumene, mica, montmorillonte, kaolinite, bentonite, hectorite, beidellite, attapulgite, chrysolite, garnet, saponite and hercynite. The inorganic filler may be of number average particle size in the range of 0.01 micron to 150 micron and is preferably of number average particle size in the range of 0.2 to 100 micron.

The fillers may optionally be treated with an effective amount of coupling agent by methods well known to those skilled in the art before they are blended into the poly(ester-amide). Such coupling agents include organosilane coupling agents exemplified by triethoxy vinylsilane, vinyl methyl dichlorosilane, 2-(trimethoxysilyl)ethyl methacrylate, 3-amino-1-triethoxysilyl) propane, etc.; organotitanium coupling agents such as the alkyl alkanoyl titanates exemplified by $C_1$ to $C_{40}$ alkyl stearyl titanates; fatty acids exemplified by oleic and stearic acid; and fatty amides exemplified by oleamide and stearamide. These coupling agents can cause a significant reduction in the melt viscosity of the polymer filler mix, can improve the wetting and dispersion of filler, and can enhance the physical properties of the adhesive composition.

The amount of inorganic filler which is dispersed in the poly(ester-amide) is sufficient to improve the high temperature creep resistance of the polymer without causing unmanageable rheology. It is preferably in the range of about 30 to about 70 parts by weight of inorganic filler dispersed in about 70 to about 30 parts by weight of poly(ester-amide). The melt viscosity of the hot melt composition containing the inorganic filler is preferably less than about 150,000 centipoises at a temperature of 232° C. and a shear rate of 3-4 sec.$^{-1}$ measured in a Brookfield Thermocel Unit Model HBT. Above 150,000 centipoise melt viscosity, the hot melt is difficult to apply and spread, and tends to be dragged from the point of application.

The filler may be blended into the block copoly(ester-amide) by any of the methods known to those skilled in the art of blending rather high ratios of fillers with rather viscous polymers such as those described herein, using batch or continuous blending. A good mix is considered to have been obtained if the filler particles are evenly distributed throughout the melt. In poor mixes, the filler particles are not adequately wet by the melt, and are not evenly distributed, remaining aggregated within the melt.

Particularly for adhesive compositions which are to be subjected to sanding, the preferred fillers are finely divided spheroidal metal powders selected from the group consisting of aluminum, iron, mild steel, stainless steel and zinc, and the particle size of these metal powders is in the range of 0.2 micron to 150 micron, preferably in the range of 4 to 100 micron. The preferred metal filler is atomized aluminum particularly when the adhesive composition is used for cavity filling since it allows the hot melt composition to be readily smoothed and burnished when it is sanded.

In addition to improving the creep resistance of the poly(ester-amide) component, metallic fillers improve the rate of melting of the adhesive composition, allow the composition to be applied and spread more easily with less pressure, impart longer "open" time between application of the hot melt and closing of the bond and higher "green" strength or faster onset of bond strength, and reduce the degree of shrinkage of the adhesive composition when it is cooled from the hot melt temperature to ambient temperature. When the composition is used to fill cavities, it can be readily sanded as discussed above, withstands extremes of temperature and humidity, is exceptionally solvent resistant and is readily painted without absorbing solvent, swelling, and blistering.

The hot melt adhesive compositions disclosed herein find widespread utility wherever hot melt adhesives are used. They are especially valuable in those applications where resistance to creep at elevated temperatures is a necessary requirement. The adhesive compositions may be used to great advantage to bond a variety of substrates including metal, glass, synthetic and natural textiles, leathers, synthetic polymeric sheet material, wood, paper, etc.

When the filled adhesive compositions are applied to metal substrates in such applications as cavity filling, a tie coat or primer has been found necessary to prevent bond failure at low temperatures particularly below 0° F. ($-18°$ C.) and indeed such primers or tie coats are advantageous at temperatures above 0° F. ($-18°$ C.) because they can cause an appreciable enhancement in peel strength. The tie coat comprises an etherified methylolmelamine in which the degree of methylolation is in the range of about 5 to about 6 and the degree of etherification of the methylolmelamine is in the range of about 3 to about 6, the ether being formed by methods conventional in the melamine aminoplast art, by condensation of the methylolmelamine with methanol or mixtures of methanol and a $C_2$ to $C_6$ alkanol or cycloalkanol such as ethyl alcohol, n-propyl alcohol, iso-propyl alcohol, n-butyl alcohol, iso-butyl alcohol, sec-butyl alcohol, t-butyl alcohol, n-amyl alcohol, iso-amyl alcohol, t-amyl alcohol, n-hexyl alcohol, cyclopentanol, cyclohexanol, etc., or mixtures thereof, to provide mixed ethers wherein the degree of etherification by methanol is at least about 2.

These etherified methylol melamines are not considered to be resinous materials since they are, as individual entities, pure compounds or at most oligomers with an average degree of polymerization of no more than about 3, but they are potential resin-forming compounds which enter into self condensation and into chemical reaction with compounds which contain reactive groups such as carboxyl, hydroxyl, and primary or secondary amide when subjected to heat and particularly when subjected to heat under acidic conditions. The concept of the degree of methylolation and etherification will be discussed here in order that this concept may be fully understood.

Theoretically, it is possible to methylolate melamine fully, that is to produce hexamethylol melamine. However, frequently a composition purporting to be hexamethylol melamine, when analyzed shows a fractional degree of methylolation. It is well recognized that fractional methylolation is not considered to be possible. As a consequence, when a composition possesses on analysis a degree of methylation of 5.75, 5.80 or even 5.90, it has to be recognized that this is but an average degree of the methylolation of the melamine compound and establishes logically that the aforementioned methylol composition is composed of a mixture of a preponderant amount of hexamethylol melamine with comparatively minor amounts of pentamethylol melamine and perhaps insignificant amounts including traces of such derivatives as tetramethylol melamine and even trimethylol melamine. The same concept of averages is also applicable to the alkylation or etherification of the methylol melamine composition. There cannot be, based on present reasoning, a fractional alkylation and, as a consequence, when on analysis, a hexamethylol melamine for example shows that the degree of methylation is 3.5, it must be concluded that there is present in such a composition principally trimethyl and tetramethyl ethers of hexamethylol melamine, some dimethyl and pentamethyl ethers and slight amounts of monomethyl and hexamethyl ethers. Thus, the etherified methylol melamines within the scope of the invention include rather complex mixtures of substantially methylolated melamine and methylolated melamine oligomers etherified so that the average degree of etherification or number of alkoxy groups per melamine unit is in the range of about 3 to about 6 and the average degree of methylation is at least about 2. Because of their reactivity and because they generate a relatively small amount of condensation volatiles, the methylolmelamines alkylated only with methanol are preferred.

While any metal surface is suitable for coating or filling with the block copoly(ester-amide) composition, preferred metals include ferous metals such as iron, mild steel and stainless steel and aluminum, brass, copper, tin and tin plate.

The amount of etherified methylolmelamine which is applied to the metal substrate can vary within wide limits. As a practical matter, it should be sufficient to enhance the peel strength of the bond between the filled block copoly(ester-amide) without reducing the lap bond strength to undesirably low values. As little as 1 g. per square meter enhances the peel strength, and as much as 166 g. per square meter has been found to give a beneficial balance of peel and lap bond strengths. Preferably the amount should be in the range of from 5 g. per square meter to 25 g. per square meter.

The etherified methylolmelamine can be applied as a solution in water or an inert organic solvent or as a dispersion in water or inert organic medium or it can be applied as a liquid or melt in the essentially undiluted state. It is preferred to apply the etherified methylolmelamine in the essentially undiluted form to avoid the need to drive off water or organic solvent. Application can be effected by dipping, spraying, brushing, rolling or by any other means conventional in the art of surface coating.

After the etherified methylolmelamine has been applied to the metal substrate and if appropriate allowed to dry, the primed metal substrate is heated to a suitable temperature to convert the etherified methylolmelamine from the liquid to the solid state and is maintained at such temperature to facilitate wetting of the surface by the filled block copoly(ester-amide) when it is applied to the primed surface. This temperature will generally be selected in the range of about 150° to 300° C. and will preferably be above the melting point of the copoly(ester-amide) but below the point where substantial decomposition of the etherified methylolmelamine or block copoly(ester-amide) can occur and will be selected also to advance the etherified methylolmelamine to the solid state without causing excessive crosslinking or embrittlement of the etherified methylolmelamine prior to application of the block copoly(ester-amide) composition. Heating is effected in any convenient manner such as by oven baking, by application of a hot air stream, or by cautious application of an open flame. Further, to avoid excessive crosslinking or embrittlement which causes the etherified methylolmelamine to flake from the substrate, it is preferred to use the etherified methylolmelamine without the addition of acid catalyst which could promote excessive self-condensation of the melamine compound during the heating step.

When the metal substrate has reached the desired temperature, the filled block copoly(ester-amide) is applied as a hot melt by any suitable means such as by the applicator guns which are conventional in the art and is spread by knife or trowel to provide a smooth coating. The metal article is then cooled and is ready for further treatment such as sanding and/or painting.

The following examples are set forth in illustration of this invention and should not be construed as a limitation thereof. Unless otherwise indicated, all parts and percentages are by weight.

Lap bond tensile strength is determined by ASTM Test Method D-1002-72.

Measurement of peel strength is based on ASTM Test Method D-1876-61T (T-peel test).

Mild steel shim stock 2.54 cm. wide, 75 microns in thickness is coated with primer resin to provide a coating weight of 25 g. per square meter. The coating is heated at 225° C. for 5 minutes and the filled polyester-/amide melt at 225° C. is coated on to the coated steel panels. The bond is closed, and excessive adhesive squeezed out and removed by wiping with hand pressure. The bond is cooled to room temperature. The bond is annealed at 90° C. for 1 hour, then tested after conditioning for 24 hours at 73° F., 50% R.H. The bond is then peeled at a rate of 25.4 cm. per minute and peel adhesion is recorded as gram/cm.

EXAMPLE 1

A block copolymer which is approximately 60 percent by weight crystalline polyethylene terephthalate segments and 40 percent by weight amorphous polyamide made from dimer acid and hexamethylene diamine is prepared in two steps. In the first step 157.5 parts (0.272 mol) of a $C_{36}$ dibasic acid and 30.8 parts (0.266 mol) of 1,6-hexane diamine are charged to a reaction vessel and heated with agitation at about 215° C. for 1 hour to form a polyamide resin. During the first 30 minutes the pressure rises to 264 g/cm² after which time the reaction vessel is vented to reduce the pressure to 158 g/cm². At the end of one hour the pressure is released and 269 parts of a crystalline polyethylene terephthalate (M.P.=260° C./inherent viscosity 0.147) and 5.9 parts (0.095 mol) of ethylene glycol are charged to the vessel along with a minor amount of an antioxidant. The vessel is flushed with nitrogen and the mixture is heated to about 280° C. while maintaining a nitrogen pressure of 70 g/cm². After 0.5 hour the vessel is vented and vacuum applied and the reaction is continued under full vacuum (0.1 to 5 mm. of mercury) for two hours. At the end of this time the resulting molten poly(ester-amide) is discharged under pressure into a water bath to quench the material. The polymer obtained melts at 185° C. and the inherent viscosity is 0.50. To a stainless steel reactor fitted with an anchor agitator and a jacketed hot oil heating system is added 100 parts by weight of the poly(ester-amide) and heating is begun. When the contents have reached 250° C., agitation is begun at 60 rpm and 100 parts by weight dry aluminum powder (Alcoa Atomized Powder 123) is fed into the mass at a rate of 10 parts by weight per minute. The agitation is continued and the temperature raised to 266° C. under a nitrogen blanket. Agitation is continued for 15 minutes after the second addition is completed and the molten mass is discharged under slight $N_2$ pressure (70 g/cm$^2$) quenched in a bath, ground and redried. This material is used as a hot melt to fill dents and orifices in large metal structures. After application it is cooled to room temperature, sanded smooth with 80 grit tungsten carbide abrasive and painted with an automotive topcoat. No "telegraphing" is observed.

EXAMPLE 2

In a sigma-bladed mixer heated by a hot oil external jacket is placed 5.0 parts by weight poly(ester-amide) of Example 1. Heat is applied and at 216° C. agitation is begun. When the mass is molten, 5.0 parts by weight of aluminum powder of average particle size 15 to 19 microns, sold by the Aluminum Company of America under the tradename Alcoa Atomized Powder No. 123) is fed over a period of 10 minutes. After addition is completed, heating and agitation is continued for 15 minutes. At this point heating is stopped and under agitation cooling is begun. With agitation under cooling the molten mass becomes friable and breaks up into free flowing aggregate mixture ranging in size from 1/16 to ⅛. This material is suitable for application as an adhesive or body filling compound when remelted.

EXAMPLE 3

A preblended mixture of 100 parts of the block copoly(ester-amide) of Example 1 and 100 parts of aluminum powder (Alcoa Powder No. 123) is fed from a hopper continuously into a Farrel Continuous Mixer whose temperature controls are set at 216° C. The mass is continuously discharged (estimated hold up time 8-10 minutes) on a cooled conveyor belt and ground. Alternately the extruded ribbon is conveyed into a cooling bath, air blow, dried and ground in conventional grinding equipment. The free flowing aggregate is suitable for use as an adhesive and/or void filling compound when remelted and applied to a suitable substrate.

EXAMPLES 4-19

In the following examples, mild steel panels are coated with a series of tie-coat resins and the filled polyesteramide of Example 3 is applied as a hot melt and the peel adhesion is determined in the manner set forth above. Examples 4-6 are within the scope of the invention. Examples 7-18 are provided for comparative purposes. In Example 7 the tie-coat is an etherified methylolmelamine with a degree of methylolation less than 1; in Examples 8-10 the tie-coats are methylated methylolureas. In Examples 11 and 12 the tie-coats are polyesteramides applied from a solution and melt; in Examples 13-16 the tie-coats are organosilanes and in Example 17, the tie-coat is a phenolic resin. The data are presented in Tables 1 and 2. In every case the tie-coats of Examples 7-17 provide appreciably poorer peel adhesion than Examples 4-6 which are within the scope of the invention. Examples 18-19 illustrate that acid treatment of the mild steel panels gives no improvement in peel adhesion.

TABLE 1
ADHESION OF FILLED POLYESTERAMIDE TO MILE STEEL:AMINOPLAST TIE-COATS

| Example | Tie-Coat | Peel Adhesion g per cm | Lap Shear Strength kg per cm$^2$ |
|---|---|---|---|
| — | None | 179 | 176 |
| 4 | M:F:MeOH; 1:5.5:5.3* | 3570 | 178 |
| 5 | M:F:MeOH; 1:5.7:5.5 | 4465 | 123 |
| 6 | M:F:MeOH; 1:5.6:2.2:2.7 | 3036 | 169 |
| 7 | M:F:MeOH:BuOH; 1:5.6:0.4:3.5 | 714 | — |
| 8 | U:F:MeOH; 1:2.3:1.64 | 179 | — |
| 9 | U:F:MeOH; 1:2.33:1.64 | 179 | — |
| 10 | U:F:MeOH; 1:2.55:1.82 | 179 | — |

M = Melamine
F = Formaldehyde
MeOH - Methanol
BuOH = Butanol
U = Urea

*Ratios are combined mole ratios.

TABLE 2
EFFECT OF TIE-COATS ON ADHESION OF FILLED POLYESTERAMIDE TO MILD STEEL

| Ex. | Tie-Coat | Peel Adhesion g per cm |
|---|---|---|
| — | None | 179 |
| 4 | M:F:MeOH; 1:5.7:5.5 | 4465 |
| 11 | Copolyesteramide solution of Example 1 | 446 |
| 12 | Copolyesteramide melt of Example 1 | 1429 |
| 13 | A-174 Silane (Union Carbide Corporation) | 179 |
| 14 | A-1120 Silane (Union Carbide Corporation) | 357 |
| 15 | AP-133 Silane (Union Carbide Corporation) | 179 |
| 16 | A-186 Silane (Union Carbide Corporation) | 357 |
| 17 | Phenolic resin P-97 (Monsanto Co.) | 895 |
| 18 | Solder flux | 179 |
| 19 | $H_2SO_4$ - $H_3PO_4$ | 179 |

EXAMPLES 20-22

In further illustration of the invention the effect of an etherified methylolmelamine with a degree of methylolation of 5.7, and degree of methylation of 5.5, applied in the fashion of Example 4 as a tie-coat between the filled copolyesteramide of Example 3 and various metal substrates is set forth in Table 3. The adhesion is significantly greater than when the tie-coat is omitted.

TABLE 3
EFFECT OF MELAMINE RESIN ON ADHESION OF COPOLYESTERAMIDE TO METAL SUBSTRATE

| | | Peel Adhesion of Polyesteramide, g per cm | |
|---|---|---|---|
| Example | Substrate | Tie-Coat | No Tie-Coat |
| 20 | Aluminum | 1607 | 536 |
| 21 | Brass | 1607 | <179 |
| 22 | Stainless Steel | 3750 | <179 |

EXAMPLES 23-25

In Examples 23-25, the copolyesteramide of Example 1 is blended with different amounts of aluminum filler in the manner setforth in Example 3. The effect of the etherified methylolmelamine used in Examples 20-22, applied in the fashion of Example 4 as a tie-coat between the filled copolyesteramides and mild steel panels is set forth in Table 4.

TABLE 4
ADHESION OF COPOLYESTERAMIDE WITH VARIOUS FILLER CONTENT

| Example | Aluminum Filler Parts per 100 parts copolyesteramide | Peel Adhesion of Filled Resin g per cm Tie-Coat | Peel Adhesion of Filled Resin g per cm No Tie-Coat |
|---|---|---|---|
| 23 | 50 | 2800 | 536 |
| 24 | 100 | 3036 | 179 |
| 25 | 150 | 2322 | 179 |

EXAMPLE 26

A mild steel panel is brushed with a coarse wire brush to remove surface oil and the occasional rust spot. The panel is heated to 100° C. with a naked flame and methylated methylolmelamine with degree of methylolation of 5.7 and degree of methylation of 5.5 is applied with a paint brush and the excess is wiped off with cotton gauze to provide a coat of 20 g. per square meter. The panel is baked for 15 minutes at 215° C. in a forced air oven. The panel is then maintained at 225° to 250° C. by application of a naked flame and the filled composition of Example 3, heated to 250° C. is pumped onto the plate by a hot melt applicator, and trowelled to a smooth surface. The surface is cooled, and can be sanded and painted by conventional methods. The coating cannot be pried from the panel at temperatures in the range of −20° to +50° C.

What is claimed is:

1. A process for adhering a filled copoly(esteramide) to a metal substrate which comprises:
   a. applying to the metal substrate a primer comprising an etherified methylolmelamine with a degree of methylolation in the range of about 5 to 6, a degree of etherification with a $C_1$ to $C_6$ alkanol or cycloalkanol in the range of about 3 to 6, and a degree of methylation of at least about 2 to provide a coating weight in the range of 1 to 166 g. per sq. meter;
   b. heating the substrate to a temperature in the range of about 150° to about 300° C. to convert the etherified methylolmelamine from the liquid to the solid state; and
   c. applying the filled copoly(ester-amide) as a hot melt to the formed surface at a temperature in the range of about 150° to 300° C.

2. The process of claim 1 wherein the etherified methylolmelamine is a methoxymethylmelamine.

3. The process of claim 1 wherein the copoly(ester-amide) comprises a crystalline and an amorphous segment.

4. The process of claim 1 wherein the filled copoly(ester-amide) comprises:
   a. from about 70 to about 30 parts by weight of a poly(ester-amide) block copolymer melting in the range of about 155° to about 225° C. having from about 30 to about 70 percent by weight of crystalline polyester segments derived from at least one aliphatic or alicyclic diol having from 2 to 10 carbon atoms and at least one alicyclic or aromatic dicarboxylic acid having from 8 to 20 carbon atoms, and from about 70 to about 30 percent by weight of amorphous polyamide segments derived from an aliphatic polycarboxylic acid containing at least 40 weight percent of a $C_{18}$ to $C_{54}$ polycarboxylic acid and an aliphatic or alicyclic primary diamine containing 2 to 10 carbon atoms; and
   b. from about 30 to about 70 parts by weight of finely divided inorganic particulate filler.

5. The process of claim 4 wherein the finely divided inorganic particulate filler is a spheroidal metal powder selected from the group consisting of aluminum, iron, mild steel, stainless steel and zinc.

6. The process of claim 1 wherein the coating weight of the primer is in the range of 5 to 25 g. per sq. meter.

7. A coated article comprising a metal substrate, a primer and a filled copoly(ester-amide); wherein the primer is a liquid etherified methylolmelamine with a degree of methylolation in the range of about 5 to 6, a degree of etherification with a $C_1$ to $C_6$ alkanol or cycloalkanol in the range of about 3 to 6, and a degree of methylation of at least about 2, which has been applied to provide a coating weight in the range of 1 to 166 g. per sq. meter and advanced to the solid state.

8. The coated article of claim 7 wherein the etherified methylolmelamine is a methoxymethylmelamine.

9. The coated article of claim 7 wherein the copoly(ester-amide) comprises a crystalline and an amorphous segment.

10. The coated article of claim 7 wherein the filled copoly(ester-amide) comprises:
    a. from about 70 to about 30 parts by weight of a poly(ester-amide) block copolymer melting in the range of about 155° to about 225° C. having from about 30 to about 70 percent by weight of crystalline polyester segments derived from at least one aliphatic or alicyclic diol having from 2 to 10 carbon atoms and at least one alicyclic or aromatic dicarboxylic acid having from 8 to 20 carbon atoms, and from about 70 to about 30 percent by weight of amorphous polyamide segments derived from an aliphatic polycarboxylic acid containing at least 40 weight percent of a $C_{18}$ to $C_{54}$ polycarboxylic acid and an aliphatic or alicyclic primary diamine containing 2 to 10 carbon atoms; and
    b. from about 30 to about 70 parts by weight of finely divided inorganic particulate filler.

11. The coated article of claim 10 wherein the finely divided inorganic particulate filler is a spheroidal metal powder selected from the group consisting of aluminum, iron, mild steel, stainless steel and zinc.

12. The coated article of claim 10 wherein the polyester block of the poly(ester-amide) is selected from the group consisting of poly(ethyleneterephthalate), co-poly(butylene terephthalate)-(ethylene terephthalate), co-poly(ethylene-terephthalate)-(ethylene isophthalate) and co-poly(ethyleneterephthalate)-(propylene terephthalate) and wherein the diamine of the amide block of the poly(ester-amide) is hexamethylene diamine.

13. The coated article of claim 10 wherein the coating weight of the primer is in the range of 5 to 25 g. per sq. meter.

14. The coated article of claim 7 wherein the coating weight of the primer is in the range of 5 to 25 g. per sq. meter.

15. A coated article comprising a metal substrate, a primer and a filled copoly(ester-amide); wherein the primer comprises an etherified methylolmelamine with a degree of methylolation in the range of about 5 to 6, a degree of etherification with a $C_1$ to $C_6$ alkanol or cycloalkanol in the range of about 3 to 6, and a degree of methylation of at least about 2, which has been applied to provide a coating weight in the range of 1 to 166 g. per sq. meter and advanced to the solid state; and wherein the filled copoly(ester-amide) comprises:

a. from about 70 to about 30 parts by weight of a poly(ester-amide) block copolymer of inherent viscosity in the range of about 0.35 to about 0.95 and of melting point in the range of about 155° to about 225° C., having from about 30 to about 70 percent by weight of crystalline polyester segments selected from the group consisting of poly(ethylene-terephthalate), co-poly(butylene terephthalate)-(propylene terephthalate) which prior to incorporation in the poly(ester-amide), have an inherent viscosity in the range of about 0.05 to about 0.70 and a melting point in the range of about 180° to about 270° C., and from about 70 to about 30 percent by weight of amorphous polyamide segments derived from a $C_{36}$ dibasic acid and analiphatic or alicyclic diamine containing from 2 to 10 carbon atoms, the inherent viscosity being determined at 25° C. with an 0.5 gram solution in 100 ml. of a solvent mixture of 60 parts by weight of phenol and 40 parts by weight of symm-tetrachloroethane; and b. from about 30 to about 70 parts by weight of spheroidal aluminum powder of particle size in the range of about 4 to about 100 microns.

16. The coated article of claim 15 wherein the coating weight of the primer is in the range of 5 to 25 g. per sq. meter.

* * * * *

UNITED STATES PATENT OFFICE
CERTIFICATE OF CORRECTION

PATENT NO. : 4,053,682

DATED : October 11, 1977

INVENTOR(S) : Donald D. Donermeyer

It is certified that error appears in the above-identified patent and that said Letters Patent are hereby corrected as shown below:

At Column 11, lines 34 and 35, add --- " --- (inch) after 1/16 and 1/2.

At Column 11, line 48, "air blow" should read --- air blown ---.

At Column 12, line 8 "MILE" should read --- MILD ---.

At Column 15, line 16, Claim 15 after "co-poly(butylene terephthalate)-" add the following --- (ethylene terephthalate), co-poly(ethylene terephthalate)-(ethylene isophthalate) and co-poly(ethylene terephthalate) ---.

Signed and Sealed this

Seventh Day of February 1978

[SEAL]

Attest:

RUTH C. MASON  
Attesting Officer

LUTRELLE F. PARKER  
Acting Commissioner of Patents and Trademarks